Jan. 19, 1965   V. J. HOLOPAINEN   3,165,842
MECHANISM FOR ATTACHING IMPLEMENTS TO VEHICLES
Filed July 26, 1962                            3 Sheets-Sheet 2
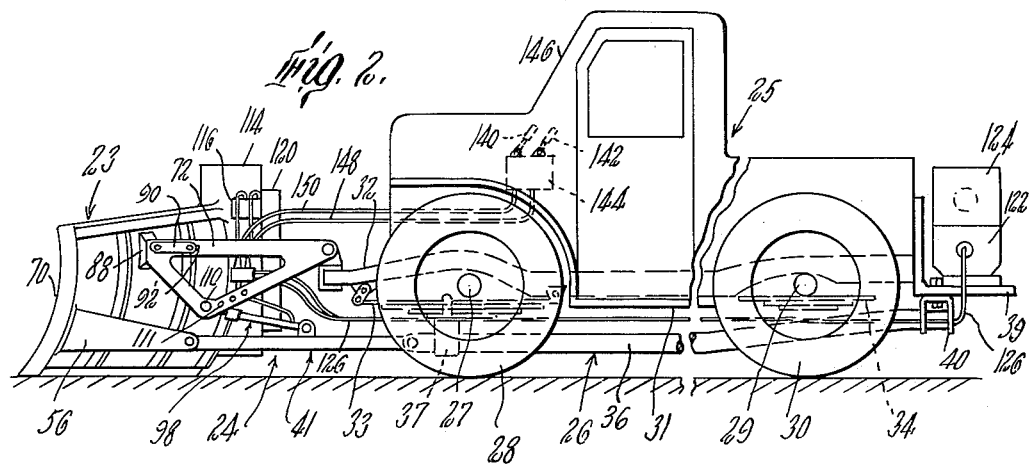
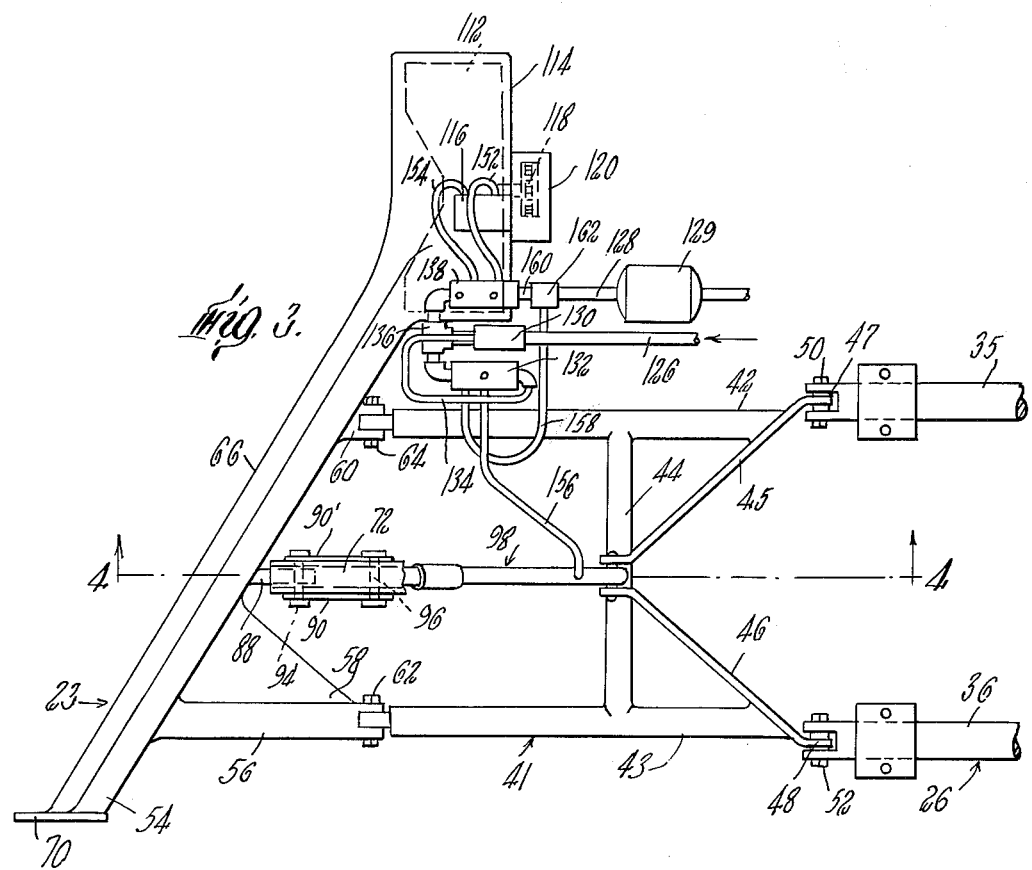

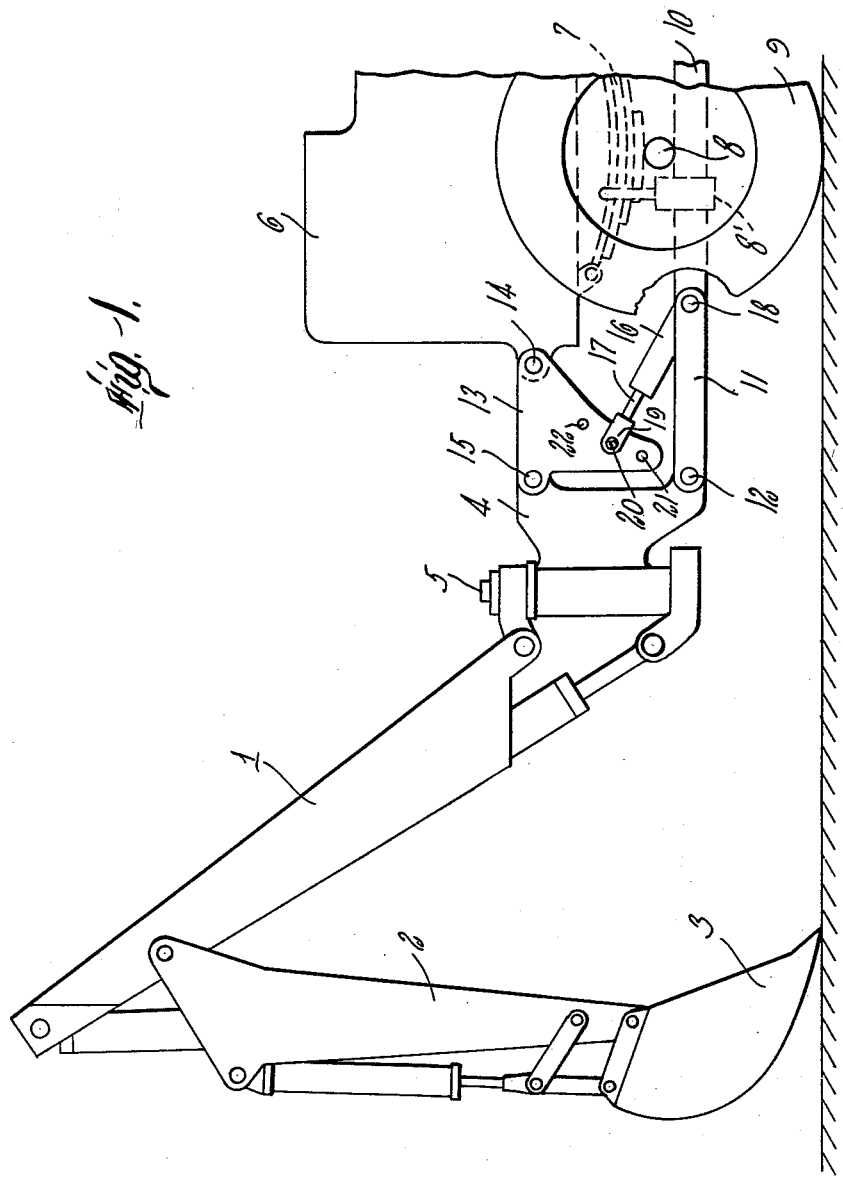

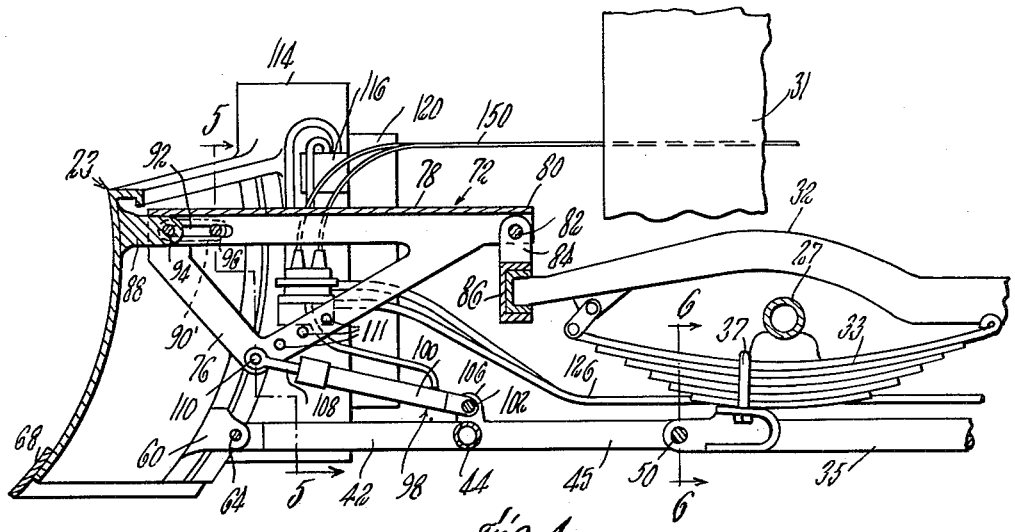
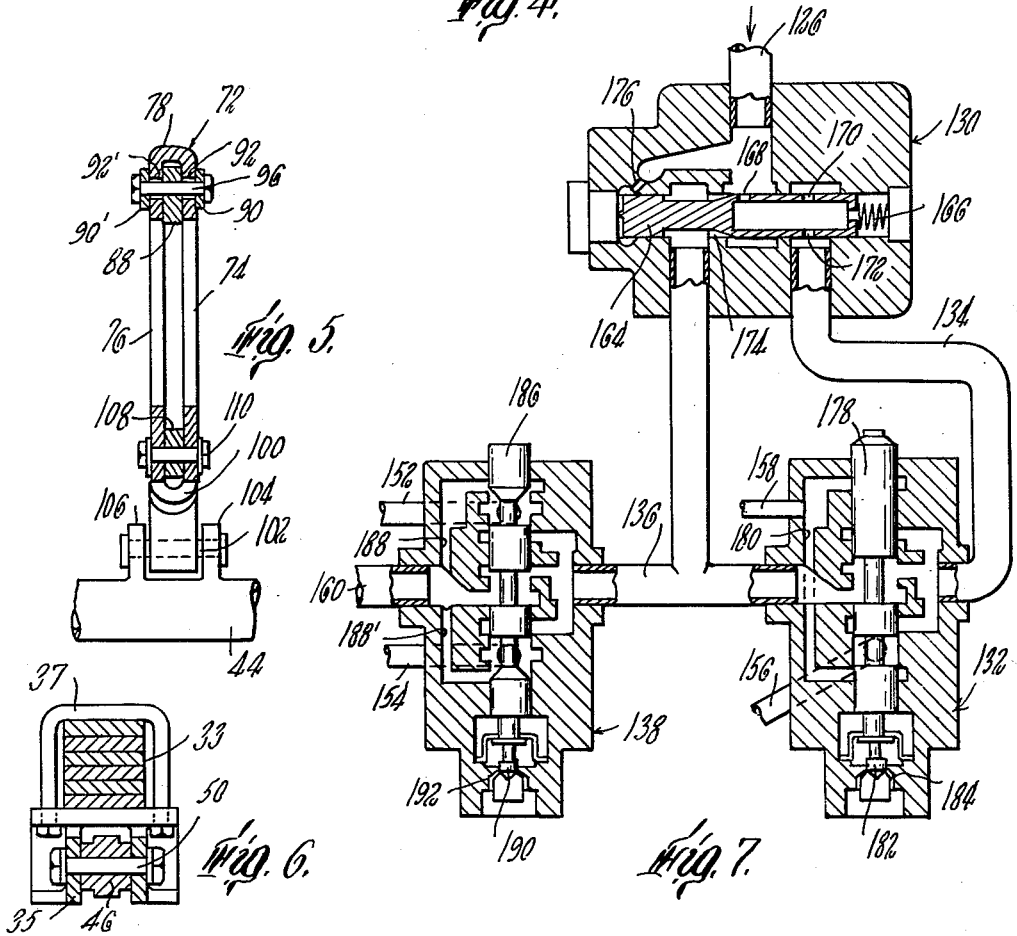

United States Patent Office 3,165,842
Patented Jan. 19, 1965

3,165,842
MECHANISM FOR ATTACHING IMPLEMENTS
TO VEHICLES
Vaino J. Holopainen, Rutland, Mass., assignor to Wain-Roy Corporation, Hubbardston, Mass., a corporation of Massachusetts
Filed July 26, 1962, Ser. No. 212,532
16 Claims. (Cl. 37—42)

The present invention relates to apparatus for attaching to and supporting from wheeled vehicles, implements such as earth moving implements, snow plows, and the like.

Many kinds of implements have now come into wide use as attachments to wheeled vehicles, such as snow plows, backhoes, loading buckets, pusher blades, post hole borers, grader blades, etc. The invention is concerned particularly with means for attaching such implements to vehicles and especially wheeled vehicles having an unsprung running gear, such as tractors, jeeps, trucks and the like. Such implement systems commonly are used with wheeled vehicles such as trucks or jeeps wherein the vehicle has an unsprung wheel and axle running gear and a chassis supported on the running gear through springs. Normally the weight of the implement is carried primarily or entirely on the sprung chassis of the vehicle. Such implements are heavy and in systems heretofore known it has often been necessary to provide the vehicle with special springs to enable it to carry the heavy load of the implement and its driving and operating gear. While it is desirable in many cases that at least some of the weight of the implement should be sprung, to improve the riding characteristics of the vehicle and/or to avoid undue possibility of damage to the running gear due to the presence of excessive unsprung load on the running gear, it is not always possible or convenient to support the implement on the vehicle chassis as its weight may be too great for the vehicle springing. The invention provides a system for attaching an implement to and supporting it entirely from a vehicle wherein the weight of the implement may be carried in part or entirely on the unsprung running gear of the vehicle, and wherein the system is adjustable to vary the proportion of the weight of the implement carried on the running gear and the proportion carried on the sprung chassis.

One particular embodiment of the invention is in a snow plow blade pushing and lifting mechanism to be attached to and removed from a vehicle and especially a wheeled vehicle. Assemblies of this general type are known and have included, in general, structure for connecting the plow blade to the vehicle so that it is pushed ahead of the vehicle, and an arrangement for raising and lowering the plow blade with respect to the vehicle so that it can be operated at a desired height, or allowed to ride along the surface of the roadway, or lifted and held clear of the roadway for travel along the road without plowing the same. Such snow plow systems commonly are used with wheeled vehicles such as trucks or jeeps, wherein the vehicle has an unsprung wheel and axle running gear and a chassis supported through springs on the running gear. Normally, when the plow blade is lifted from the ground the weight of the plow blade and associated structure is carried primarily, or entirely, on the sprung chassis of the vehicle. The plow blade and associated structure is heavy and in systems heretofore known it has often been necessary to provide the vehicle with special springs to enable it to carry the heavy load of the snow plow and its driving and lifting gear.

The present invention has as an object to provide a simple and effective means for supporting an implement from a vehicle.

A further object of the invention is to provide such means for supporting an implement on a vehicle which overcomes disadvantages of heretofore known systems.

A further object of the invention is to provide such a system for supporting an implement on a vehicle wherein the weight of the implement may be carried in part or entirely on the unsprung running gear of the vehicle.

A further object is to provide such a system for supporting an implement on a vehicle wherein the proportion of the weight of the implement carried on the chassis may be varied and the proportion of the weight of the implement carried on the running gear may be varied.

A further object is to provide a snow plow pushing and lifting system which overcomes disadvantages of heretofore known systems.

A further object is to provide a snow plow and improved pushing and lifting accessories therefor which can be conveniently and rapidly attached to and removed from a vehicle.

A further object is to provide a snow plow blade and pushing and lifting gear for connecting the same to a vehicle wherein the weight of the blade and gear may be carried in large part on the unsprung part of the vehicle.

A further object of the invention is to provide a snow plow blade and pushing and lifting gear for connecting the same to a vehicle wherein the proportion of the weight of the blade carried on the unsprung parts and the sprung parts of the vehicle may be varied.

A further object is to provide a snow plow blade having a power driven impeller for positively discharging snow from the trailing end of the blade wherein the impeller is power driven by a pressure fluid system under the control of the operator in the cab of the vehicle.

A further object of the invention is to provide a simple and effective hydraulic system for operating the snow plow blade and its accessories.

A further object is to provide a snow plow pushing and lifting system wherein raising and lowering of the plow blade is accomplished by means of a power operated pressure fluid system under the control of the operator from the cab of the vehicle.

Other objects, features and advantages of the invention will become apparent from the following description of presently preferred embodiments of the invention, in which description reference is made to the accompanying drawings, wherein FIG. 1 is an elevation of a vehicle having an implement mounted thereon by apparatus embodying the invention;

FIG. 2 is an elevation of a vehicle with a snow plow blade and pushing and lifting gear attached thereto;

FIG. 3 is a plan view of the plow blade and its pushing and lifting system detached from the vehicle;

FIG. 4 is a vertical mid-sectional view on line 4—4 of FIG. 3, to an enlarged scale;

FIG. 5 is a vertical sectional view on line 5—5 of FIG. 4;

FIG. 6 is a vertical sectional view on line 6—6 of FIG. 4, each sectional view showing the parts as seen when looking in the direction of the arrows, and, FIG. 7 is a schematic view of the control valves for the pressure fluid system.

In accordance with the invention I provide means for supporting an implement on a vehicle having a sprung chassis supported on an unsprung running gear, for example wheels and axles, wherein a substantial part of the weight of the implement may be supported on the running gear, or a substantial or lesser amount of the weight may be supported on the vehicle chassis. The means for attaching the implement to and supporting it from the vehicle includes a first link pivoted at one end on the running gear and at its opposite end to the implement and a second link pivoted on the chassis and having its opposite end pivoted on the implement at a point above the attachment of the first link to the implement, and extensible means, preferably a pressure fluid jack, acting between the running gear and said second link, for tending to rotate the second link about its pivot on the chassis so as to support the weight of the implement. Means is provided for detachably connecting said extensible means to said second link selectively at any one of a plurality of spaced points on said link, said points differing in their distance from the pivot of the second link on the chassis (and on the implement), whereby the proportion of the weight of the implement carried on the chassis may be varied and the proportion of the weight of the implement carried on the running gear may be varied. By appropriate adjustment of said point of attachment of the extensible means to the second link, the division of the weight of the implement between the chassis and running gear may be adjusted to the value desired.

In accordance with the invention I further provide a snow plow, including a snow plow blade, particularly adapted for convenient attachment to and detachment from a wheeled vehicle having a sprung chassis supported on an unsprung running gear, and wherein a substantial part of the weight of the plow when it is lifted from the ground may be supported on the unsprung part of the vehicle. The invention provides a snow plow blade having a push frame attached to the rear face thereof, adjacent the lower part of the blade, for pivotal movement about a transverse axis inclined to the working face of the blade, said push frame corresponding to said first link and being adapted for attachment to a subframe forming part of the running gear. Pivoted to the upper part of the rear face of the blade is a link, corresponding to said second link, adapted to be pivotally connected at its rear end to the sprung chassis of the vehicle. Power operated extensible means is provided for swinging said link about its pivot on the chassis to lift the plow, said power operated means acting between the link and the unsprung part of the vehicle. The pivotal connection of the push frame to the blade is such that the blade as it rises when pivoting on the push frame is tilted transversely, its leftward, or leading, end rising faster than its trailing, or right end, the connection of the link to the plow blade being yieldable to permit tipping of the blade forwardly and backwardly.

Referring now to the particular embodiments of the invention to be disclosed for purposes of illustration, and particularly to FIG. 1, the implement in this embodiment is a conventional backhoe comprising a boom 1, a dipper stick 2 pivoted on the boom 1 and a bucket 3 supported at the free end of the dipper stick 2. The boom 1 is carried on a bracket 4 for swinging movement about a vertical axis at 5. The entire backhoe assembly is carried on a vehicle comprising a chassis 6 supported by means of a spring 7 on an axle 8 carrying wheels, one of which is shown at 9. Also mounted on the axle 8 by a clip 8', as a part of the running gear, is a subframe 10 on which is pivoted at its end adjacent the end of the vehicle a link 11 pivoted at its opposite end 12 to the bracket 4. A similar link, not shown, interconnects the subframe 10 and bracket 4 on the far side of the vehicle, as seen in FIG. 1. A second link 13, triangular in shape, is pivoted at 14 on the chassis 6 and at 15 on the bracket 4. An extensible means, comprising a pressure fluid jack having a cylinder 16, a piston (not shown) and a piston rod 17, acts between the running gear and the link 13, one end of the cylinder being pivoted at 18 to the subframe 10 and the end 19 of the piston rod 17 being pivoted to the link 13. The pivot 18 of the cylinder 16 may be located on the link 11. The end 19 of the piston rod may be connected to the link 13 at any one of a plurality of different points 20, 21 or 22, as shown. By adjustment of the point of connection between the piston rod end 19 and the link 13 the relative value of the vertical component of force applied to link 13 by the jack may be varied to change the proportion of the weight of the implement carried on the subframe or the chassis. Thus, in the particular embodiment shown, attachment of the jack at the point 22 causes all, or substantially all, of the weight of the implement to be transferred to the running gear, with little or no weight carried on the chassis 6. With the jack connected at the point 21 a greater part of the weight of the implement is carried on the chassis.

Referring now to the snow plow embodiments of the invention shown in FIGS. 2–7, the snow plow assembly comprises, referring to FIG. 2, a snow plow blade 23, a blade pushing and lifting system indicated generally at 24, a vehicle 25, in this instance a jeep, and a subframe 26 adapted to be connected to the vehicle to provide one point of attachment of the pushing and lifting assembly, in such a way that the vertical load on the vehicle as the blade is lifted may be applied in large part to the unsprung running gear of the vehicle.

The vehicle 25 includes a front axle 27 and front wheels 28, only one of which is shown, and a rear axle 29 and rear wheels 30, only one of which is shown. The chassis 31 of the vehicle includes the usual main frame 32 supported on the axles 27 and 29 by means of leaf springs 33 and 34.

The subframe 26 includes a pair of longitudinal members 35, 36 supported from the front spring 33 by means of a clip 37. The connection of the subframe members to the spring is not intended to prevent longitudinal movement of the subframe with respect to the vehicle but does provide that substantially the entire vertical load applied to the subframe is transmitted to and carried by the running gear. The rear end of the chassis 31 is provided with a bracket 39 firmly secured to the main frame 32. The rear ends of the subframe members 35 and 36 are anchored to the bracket 39 by means of a clip 40 to prevent longitudinal movement of the subframe under the loads applied to it by the snow plow blade. The front ends of the subframe longitudinal members 35, 36 may if desired be interconnected by an additional frame member.

Supported on the subframe 26 at its forward end is a push frame 41 (FIG. 3) comprising longitudinal side members 42 and 43 interconnected by a strut 44 and by diagonally extending frame members 45 and 46 each of which is provided at its rear end with a pierced ear, 47 and 48 respectively, adapted to be pivoted to the forward ends of the subframe members 35 and 36 by means of bolts 50, 52, respectively, whereby the push frame may pivot on the subframe about an axis which extends transversely of the vehicle at right angles to the longitudinal axis of the vehicle.

The plow blade 23 is provided adjacent its leading, or left, end 54 with a rearwardly extending lug 56 rigidly connected to the rear face of the blade and braced by a web 58 welded to the lug 56 and to the back of the blade. A similar but shorter lug 60 is welded to the rear of the blade as shown. The lugs 56 and 60 are adapted to be pivotally connected to the front ends of the push frame members 43, 42, respectively, by means of bolts 62, 64, so that the blade is pushed ahead of the vehicle by the push frame 41. The push frame 41 is generally rectangular in shape, as shown, and the lug 56 is relatively longer than the lug 60, so that although the blade is pivoted on the push frame 41 for movement about an axis which extends transversely of the vehicle generally at right angles to its longitudinal axis, the working face 66 of the blade extends at an inclination to the longitudinal axis of the vehicle with its leading end 54 in advance of the rest of the blade. Because of this geometric arrangement of the pivotal connection of the blade 23 to the subframe 26 through the push frame 41, when the blade is raised by its contact with the ground when it is running, pivoting about the bolts 62 and 64, its left end rises more rapidly than the rest of the blade, thus tending, I have found, better to accommodate the blade to the road surface, especially when it is in use on a crowned roadway.

The plow blade 23 may, it is understood, be provided with a cutting edge 68 and with conventional shoes for engagement with the ground, and may be provided at its left end with a slicer plate 70, as is well known in the art.

The plow 23 is connected to the chassis of the vehicle through a lift link 72. The lift link 72 is generally triangular in shape as seen in side elevation and comprises two spaced webs 74, 76 and an interconnecting portion 78, as appears to best advantage in FIG. 5. The rear corner 80 of the link 72 is pivoted on a bolt 82 passing transversely through a hitch member 84 firmly secured to the bumper 86 (which in turn is rigidly secured to the main frame members 32), or to the chassis.

The forward corner of the link 72 is pivotally connected to the blade 23 at a point higher than the lugs 56, 60 by means of a lug 88 welded to the rear face of the blade and extending rearwardly between the webs 74, 76 of the link 72. Disposed on the outer faces of the webs 74, 76 are links 90, 90'. The web 74 is provided with a slot 92 and the web 76 with a similar slot 92'. The lug 88 is pivoted on a pin 94 passing through holes in the forward ends of links 90, 90' and through slots 92 and 92'. A bolt 96 passes through holes in the rear ends of links 90, 90' and through the slots 92, 92'. The pin 94 and bolt 96 fit loosely in the links 90, 90' and slots 92, 92' to permit rocking of the lug 88 with respect to the link 72. The blade 23 may be tipped forwardly or rearwardly to a desired position by moving the pin 94 forwardly or rearwardly in the slots 92, 92' by moving the bolt 96 and links 90, 90' forwardly or rearwardly as desired and then tightening bolt 96. Under some operating conditions, for example when operating on crowned roads, the bolt 96 is preferably left loose, to permit limited forward and rearward tilting movement of the blade 23, so that the plow blade may pivot about the bolts 62, 64 at the forward end of the push frame 41 as the blade rises and falls in following the ground.

The link 72 is adapted to be swung upwardly about its pivot on the chassis at bolt 82 to raise the plow blade 23. For this purpose, a pressure-fluid-operated extensible member or jack 98 acting between the link 72 and the running gear is provided. The jack 98 comprises a pressure fluid cylinder 100 pivoted at its lower rear end on a cross pin 102 extending between ears 104 and 106 welded to the strut 44. The cylinder 100 could, instead, be pivoted on the subframe 26, if desired, if the subframe extends sufficiently forwardly for this purpose. The cylinder 100 contains a piston (not shown) having a piston rod 108 pivotally connected to the lift link 72 by a bolt and nut 110 passing through any one of several sets of holes 111 in the webs 74, 76. As appears in the drawing, the rear end of the jack 98 is connected indirectly to the subframe 26 by means of its connection to the push frame 41 at a point well rearwardly of the point of connection of the push frame to the blade 23, and the jack extends upwardly and forwardly from this pivot point to its connection to the lift link 72, at a point well forward of the pivotal axis at 82 on which the link is connected to the vehicle chassis.

The blade 23 is provided with a power driven impeller 112 contained in a housing 114 carried at the right, or trailing, end of the blade 23. The impeller 112 is adapted to receive snow as it moves to the right along the blade and throw it out of and away from the snow plow to the right of the vehicle. The impeller 112 is driven by means of a fluid pressure motor 116 supported on the housing 114, and connected to the shaft of the impeller by means of a drive chain 118, protected by a housing 120. A mechanical drive instead of a fluid pressure drive, may be employed if desired for driving the impeller.

Pressure fluid for operating the impeller 112 and the lifting jack 98 is provided by means of a pump 122 driven by a prime mover 124, both of which may conveniently be mounted on the bracket 39 at the rear of the vehicle. A pair of pressure fluid conduits comprising a pressure line 126 and a return line 128 lead forwardly from the pump 122 to a pressure fluid control mounted on the housing 114 on the blade 23. The return line 128 contains a reservoir or tank 129, as is well understood in the art, located adjacent the pump 122 or in any other convenient location. The pressure fluid control comprises a flow divider valve 130 which receives pressure fluid from the pressure line 126 and diverts a constant volume of fluid to the lift cylinder control valve 132, through a line 134. The main discharge from the flow divider valve 130 passes into the pressure header 136 interconnecting the lift control valve 132 and the impeller motor control valve 138.

The motor control valve 138 and the lift cylinder control valve 132 are independently operated by control handles 140 and 142 on a control panel 144 located in the cab 146 of the vehicle. The control panel 144 is connected to the respective valves 132, 138 through Bowden wires 148, 150, or otherwise, so that each valve can be operated at will by the operator. From the motor valve 138 the lines 152, 154 lead to the motor 116. The line 156 leads from the lift cylinder valve 132 to the lower end of the lifting jack 98. Exhaust lines, 158 from lift cylinder valve 132 and 160 from motor valve 138, lead to the return manifold 162 from which the fluid is returned to the pump 122 through return line 128 and reservoir 129.

The flow divider valve 130 diverts a constant volume of fluid from the pressure line 126 to the inlet line 134 of the lift cylinder control valve 132, this supply of fluid taking priority over the fluid provided from the flow divider valve 130 to the motor control valve 138. The flow divider valve 130 is of a conventional construction, including a spool 164 spring biased to the left (FIG. 7) by a spring 166. A constant volume of fluid is metered to the line 134 through the orifices 168, 170 and 172 in the spool, these orifices establishing communication between the pressure line 126 and the line 134 in all positions of the valve spool. Any excess fluid available from the line 126 passes through the tapering orifices 174 to the header 136, some of the fluid from the pressure line 126 being bled through orifice 176 to the left hand head of the spool 164 to move the spool to the right against the action of the spring 166, to progressively open the orifices 174 upon increase of pressure in the line 126. This valve 130 is fully automatic in operation and requires no attention by the operator.

The lift cylinder control valve 132 also is of conventional construction, including a plunger 178 adapted to be moved into any one of three positions by the control handle 142 in the cab. In the central position corresponding to the central position of handle 142, shown in FIG. 7, the plunger 178 connects the inlet line 134 to the header 136 so that the fluid supplied to valve 132 is directed by it to the impeller motor 116, the pressure fluid not being needed to lift the blade 23. At the same time the line 156 to the lift cylinder is closed and the return line 158 leading to the reservoir also is closed. Accordingly, in this position of valve 132 the lifting jack 98 is locked in position. This position of the valve will be employed, for example, to hold the plow blade 23 in an elevated position, when the snow plow is traveling on the highway without plowing. To lift the plow, the control handle 142 is moved rearwardly to move the plunger 178 upwardly from the position shown in FIG. 7. In this position the plunger 178 closes off the connection of the valve to the header 136 so that all of the pressure fluid supplied through the inlet line 134 is available to operate the lifting jack 98. In this position, the inlet line 134 is connected to the line 156 to the lifting jack 98 to supply pressure fluid to the jack. The line 158 to the reservoir is closed. To lower the blade 23 the operator moves the control handle 142 forwardly from its central position to cause the plunger 178 to be moved downwardly from its central position shown in FIG. 7. In this position the plunger 178 connects the line 156 from the lifting jack 98 to the exhaust line 158 through the passageway 180, allowing fluid to exhaust from the lifting jack 98. At the same time the plunger 178 connects the inlet line 134 to the header 136 so that the pressure fluid supplied through the line 134, not now being needed to operate the jack 98, is diverted to the impeller motor 116. In this position of the valve 132 the plow blade 23 is lowered, until it is not supported by the jack 98 and rests on the ground on its supporting shoe 68. This is a normal plowing position. To make it unnecessary for the operator to hold on to the control handle 142 continually while plowing, the handle 142 may be moved still further forwardly, further moving the plunger 178 downwardly to engage the knob 182 with spring fingers 184 to hold the plunger 178 in its down position.

The impeller motor control valve 138 is of conventional construction having a plunger 186 adapted to be positioned in any one of three positions by means of the control handle 140. In one position the valve 138 causes the impeller motor 116 to be rotated in one direction, in another position to be rotated in the opposite direction, and in the third position does not drive the impeller but leaves it free to be rotated, for example by hand.

In its central position corresponding to the central position of the control handle 140, shown in FIG. 7, the plunger 186 connects the pressure header 136 to the reservoir or exhaust line 160 and disconnects the pressure header 136 from both the motor lines 152 and 154. In this position, passages 188, 188' connect the motor lines 152, 154 together and to line 160 to the reservoir 129, leaving the impeller free to be moved. When the control handle 140 is moved, say forwardly, to move the plunger 186 upwardly from the position shown in FIG. 7, the plunger 186 disconnects the pressure header 136 from the exhaust line 160, connects the pressure header 136 to motor line 154, connects the motor line 152 to the exhaust line 160 and disconnects the motor line 154 from the exhaust line 160. Accordingly pressure fluid is supplied from the header 136 to the motor line 154, the other motor line 152 being connected to exhaust, to drive the motor in one direction. When the control handle 140 is moved to its rear position to move the plunger 186 into its down position, as seen in FIG. 7, the plunger 186 connects the pressure header 136 to motor line 152 and disconnects line 152 from the exhaust line 160. At the same time the plunger 186 disconnects the pressure header 136 from the motor line 154 and connects motor line 154 to exhaust line 160. Thus the impeller motor 116 is driven in the opposite direction. This direction is the normal one for plowing, the impeller rotating in the direction to throw snow away from the plow. The operator may wish to rotate the impeller temporarily in the opposite direction, for example to free it from snow if it should become clogged. To relieve the operator from continuously holding on to the handle 140 when plowing, the handle may be moved still further rearwardly, causing the plunger 186 to move further downwardly to engage the knob 190 with spring fingers 192 to hold the plunger in its down position, rotating the impeller 116 in the normal plowing direction.

When pressure fluid is admitted to the lifting jack 98 to raise the plow blade 23, by operation of valve 132, as described, the pressure fluid causes the jack to be extended, applying an upward and forward pressure to the link 72 at the bolt 110, swinging the link about its pivot at 82 on the vehicle chassis. A substantial part of the weight of the plow blade 23 and its associated pushing and lifting mechanism thus is applied through the push frame 41 to the subframe 26 of the vehicle, thus supporting the weight of the blade, or a substantial part thereof, on the unsprung part of the vehicle, relieving the load on the springs and substantially reducing the need to provide special springing in vehicles intended for use with the plow. The proportion of the weight of the plow carried on the chassis and the running gear may be varied by connecting the piston rod 108 of the jack 98 to different ones of the series of holes 111 in the link 72, FIG. 3.

It will be appreciated from the foregoing description that the invention provides a simple but effective mechanism for attaching an implement to a vehicle which is effective in accomplishing the objects of the invention and provides a snow plow and lifting and pushing mechanism therefor which is of effective yet simple construction, which can readily be disconnected from and connected to a vehicle with which it is to be used, and which is adapted for use with standard wheeled vehicles, such as the well known jeep, without requiring radical alteration of the vehicle, such as special springing.

Although specific embodiments of the invention have been described herein, it is not intended to limit the invention solely thereto, but to include all of the obvious variations and modifications within the spirit and scope of the appended claims.

I claim:

1. A vehicle and implement assembly comprising a vehicle having an unsprung running gear and a sprung chassis supported on said running gear, an implement to be supported on said vehicle, means pivotally connecting said implement to said running gear, a link pivoted on said chassis and pivotally connected to said implement above the connection thereof to said running gear, and extensible means acting between said link and said running gear for urging said link about its pivot on said chassis to support said implement on said vehicle.

2. A vehicle and implement assembly comprising a vehicle having an unsprung running gear and a sprung chassis supported on said running gear, an implement to be supported on said vehicle, means pivotally connecting said implement to said running gear, a link pivoted on said chassis and pivotally connected to said implement above the connection thereof to said running gear, extensible means acting between said link and said running gear for urging said link about its pivot on said chassis to support said implement on said vehicle, and means for selectively detachably connecting said extensible means to said link at a plurality of spaced points on said link.

3. A vehicle and implement assembly comprising a wheeled vehicle having an unsprung front axle and wheels and a sprung chassis supported in part on said front axle, an implement to be supported on said vehicle, a subframe supported in part by said axle, connected adjacent its one end to said chassis, and pivotally connected at its other end to said implement, a link having its one end pivoted on said chassis adjacent an end thereof and above said subframe and having its other end pivotally connected to said implement above the connection of said subframe thereto, and a pressure fluid jack having one end pivotally connected to said subframe and extending upwardly from said one end with its other end pivotally connected to said link at a point spaced outwardly of the vehicle from the pivotal connection of said link to said chassis, said jack being extensible for swinging said link about its pivot on said chassis to lift said implement.

4. A vehicle and implement assembly comprising a wheeled vehicle having an unsprung front axle and wheels and a sprung chassis supported in part on said front axle, an implement to be supported on said vehicle, a subframe supported in part by said axle, connected adjacent its one end to said chassis, and pivotally connected at its other end to said implement, a link having its one end pivoted on said chassis adjacent an end thereof and above said subframe and having its other end pivotally connected to said implement above the connection of said subframe thereto, a pressure fluid jack having one end pivotally connected to said subframe and extending upwardly from said one end with its other end pivotally connected to said link at a point spaced outwardly of the vehicle from the pivotal connection of said link to said chassis, said jack being extensible for swinging said link about its pivot on said chassis to lift said implement, and means for selectively detachably connecting said jack to said link at a plurality of spaced points on said link.

5. A vehicle and implement assembly comprising a vehicle having an unsprung axle and a sprung chassis supported at least in part on said axle, a subframe connected to said axle, a push frame supported on said subframe forwardly thereof for pivotal movement thereon about a transverse axis, an implement connected to the outer end of said push frame for pivotal movement thereon about a transverse axis, a link pivoted on said chassis above said push frame and pivotally connected to said implement, and power operated extensible means acting between said link and said subframe for urging said link about its pivot on said chassis to support said implement.

6. A snow plow comprising a vehicle having an unsprung axle and a sprung chassis supported at least in part on said axle, a snow plow blade, a subframe connected to said axle and pivotally connected at its front end to said blade to push the same ahead of the vehicle, a link pivoted on said chassis above said subframe and pivotally connected to said blade, and extensible means acting between said link and said subframe for swinging said link about its pivot on said chassis to lift said blade.

7. A snow plow comprising a wheeled vehicle having an unsprung front axle and wheels and a sprung chassis supported in part on said front axle, a snow plow blade, a subframe supported in part by said axle, connected adjacent its rear end to said chassis, and pivotally connected at its front end to said blade to push the same ahead of the vehicle, a link having its rear end pivoted on said chassis adjacent the front thereof and above said subframe and having its front end pivotally connected to said blade above the connection of said subframe thereto, and a pressure fluid jack having one end pivotally connected to said subframe at a point spaced rearwardly from said blade and extending upwardly and forwardly from said one end with its other end pivotally connected to said link at a point spaced forwardly from the pivotal connection of said link to said chassis, said jack being extensible for swinging said link about its pivot on said chassis to lift said blade.

8. A snow plow comprising a vehicle having a sprung chassis and an unsprung subframe connected to said chassis, a snow plow blade disposed in front of said vehicle and extending crosswise of the vehicle at an inclination to the longitudinal axis of the vehicle and connected to said subframe for pivotal movement about a transverse axis extending at an inclination to said plow blade, a link pivotally interconnecting said chassis and said plow blade, and a pressure fluid operated jack acting between said sub-frame and said link for lifting said link to lift the plow blade.

9. A snow plow comprising a vehicle having an unsprung axle and a sprung chassis supported at least in part on said axle, a subframe connected to said axle, a push frame supported on said subframe forwardly thereof for pivotal movement thereon about a transverse axis, a snow plow blade disposed in front of said push frame, extending crosswise of the vehicle at an inclination to the longitudinal axis of the vehicle and connected to said push frame for pivotal movement thereon about a transverse axis, a link pivoted on said chassis adjacent the front thereof and pivotally connected to said blade, and power operated extensible means acting between said link and said subframe for swinging said link about its pivot on said chassis to lift said blade.

10. A snow plow comprising a vehicle having a sprung portion and an unsprung portion, a subframe rigidly connected to said unsprung portion, a push frame supported on said subframe forwardly thereof for pivotal movement thereon about a transverse axis, a snow plow blade disposed in front of said push frame extending crosswise of the vehicle at an inclination to the longitudinal axis of the vehicle and connected to said push frame for pivotal movement thereon about a transverse axis, a link interconnecting said blade and said sprung portion and having a longitudinally yieldable pivotal connection with said blade, and a pressure fluid operated jack acting between said subframe and said link for lifting said link to lift the plow blade.

11. A snow plow comprising a vehicle having a sprung portion and an unsprung portion, a snow plow blade, a push frame connected at one of its ends to said blade for pivotal movement about an axis extending at an inclination to said blade and connected at its other end to said unsprung portion, a link having one end yieldably pivotally mounted on said blade and having its other end pivotally connected to said sprung portion, a pressure fluid jack extending between said link and said push frame and pivotally connected to each, a rotary impeller mounted on said blade adjacent one end thereof, and a pressure fluid motor mounted on said blade and connected to said impeller to drive the same.

12. A snow plow comprising a vehicle having a sprung portion and an unsprung portion, a snow plow blade, a rotary impeller mounted on said blade adjacent one end thereof for rotation about a horizontal axis, a pressure fluid motor mounted on said blade, a driving connection between said motor and impeller, a link having one end pivoted on said blade and having its other end pivotally connected to said sprung portion, a pressure fluid jack for lifting said blade acting between said link and said unsprung portion, a pressure fluid conduit supported on said blade, and a valve mounted on said blade for selectively connecting and disconnecting said conduit to said impeller and to said jack.

13. A snow plow comprising a vehicle, a first prime mover for driving said vehicle, a snow plow blade connected to said vehicle, a rotary impeller mounted on said blade, a pressure fluid motor mounted on said blade, driving connections between said motor and said impeller, a link pivotally interconnecting said blade and said vehicle, a pressure fluid jack pivotally connected to said link and acting between said link and said vehicle for lifting said blade, a pressure fluid pump mounted on said vehicle, a second prime mover mounted on said vehicle for driving said pump, and pressure fluid conduits connecting said pump to said pressure fluid motor and to said jack.

14. A snow plow comprising a vehicle having an unsprung axle and a sprung chassis supported at least in part on said axle, a snow plow blade, a subframe connected to said axle and pivotally connected at its front end to said blade to push the same ahead of the vehicle, a link pivoted on said chassis above said subframe and pivotally connected to said blade, pressure fluid means acting between said link and said subframe for swinging said link about its pivot on said chassis to lift said blade, a source of pressure fluid and a valve for optionally connecting and disconnecting said source and said pressure fluid means.

15. A snow plow comprising a vehicle having a sprung portion and an unsprung portion, a snow plow blade, a push frame connected at one of its ends to said blade for pivotal movement and connected at its other end to said unsprung portion, a link having one end yieldably pivotally mounted on said blade and having its other end pivoted on said sprung portion, a hydraulic jack extending between said link and said push frame and pivotally connected to each, a rotary impeller mounted on said blade adjacent one end thereof, a pressure fluid motor mounted on said blade and connected to said impeller to drive the same, a first valve for controlling the supply of pressure fluid to said jack, a second valve for controlling the supply of pressure fluid to said motor, and a third valve for supplying a constant volume of pressure fluid to said first valve, and for supplying pressure fluid to said second valve.

16. A snow plow comprising a vehicle having a sprung portion and an unsprung portion, a snow plow blade, means pivotally connecting said blade to said unsprung portion, a link pivotally connected to said blade and to said sprung portion, and extensible means acting between said link and said unsprung portion for urging said link about its pivot on said sprung portion to apply a lifting force to the blade.

References Cited in the file of this patent
UNITED STATES PATENTS

| | | |
|---|---|---|
| 1,365,153 | Clark | Jan. 11, 1921 |
| 1,914,610 | Meyer | June 20, 1933 |
| 2,055,794 | Hewitt | Sept. 29, 1936 |
| 2,242,826 | Keeler | May 20, 1941 |
| 2,858,625 | Rivinius | Nov. 4, 1958 |
| 2,974,430 | Bernotas | Mar. 14, 1961 |